United States Patent [19]

Krull et al.

[11] 4,345,623
[45] Aug. 24, 1982

[54] MULTIPORT DISK VALVE, ESPECIALLY FOR DUST-REMOVER DUCT SYSTEMS

[75] Inventors: Walther Krull, Lübeck; Dieter Köhn, Neustadt; Wolf-Dieter Schiller, Lübeck, all of Fed. Rep. of Germany

[73] Assignee: Beth GmbH, Lübeck, Fed. Rep. of Germany

[21] Appl. No.: 141,152

[22] Filed: Apr. 17, 1980

[30] Foreign Application Priority Data

Apr. 23, 1979 [DE] Fed. Rep. of Germany ....... 2916311

[51] Int. Cl.³ ...................... F16K 31/122; F17D 3/00
[52] U.S. Cl. ........................... 137/637.2; 137/614.11; 137/614.17; 137/869; 251/63.5; 251/85; 251/86; 251/318; 251/31
[58] Field of Search ..................... 137/637, 637.2, 869, 137/872, 614.11, 614.17, 614.18; 251/62, 318, 85, 86, 31, 63.5

[56] References Cited

U.S. PATENT DOCUMENTS

| | | | |
|---|---|---|---|
| 663,593 | 12/1900 | Wilson et al. | 137/637.2 |
| 1,949,177 | 2/1934 | Otto | 137/637.2 |
| 2,130,796 | 9/1938 | Grayson | 251/85 |
| 2,749,895 | 6/1956 | Flint | 251/85 |
| 2,902,249 | 9/1959 | Meusy | 251/85 |
| 3,637,188 | 1/1972 | Ung | 137/637.2 |
| 3,895,651 | 7/1975 | Okeda et al. | 137/637.2 |
| 4,103,708 | 8/1978 | Huntington | 137/614.11 |
| 4,223,867 | 9/1980 | Nino et al. | 251/62 |
| 4,239,061 | 12/1980 | Peterson | 137/614.11 |
| 4,304,251 | 12/1981 | Schädel et al. | 137/614.17 |

FOREIGN PATENT DOCUMENTS

| | | | |
|---|---|---|---|
| 505133 | 4/1929 | Fed. Rep. of Germany . | |
| 2027792 | 7/1971 | Fed. Rep. of Germany . | |
| 2623301 | 8/1977 | Fed. Rep. of Germany | 137/240 |
| 48268 | 3/1909 | Switzerland | 251/62 |
| 14530 | of 1898 | United Kingdom | 137/637.2 |

Primary Examiner—George L. Walton
Attorney, Agent, or Firm—Montague & Ross

[57] ABSTRACT

A multiport valve for a dust-collection system has a pair of axially spaced seats for two of the ports which can be selectively engaged by a valve member in the form of two oppositely convex shells adapted to bear against one another at their edges. In addition, the shells can be separated so that each engages one of the seats. The actuator for the valve member or plate comprises two telescoping members which can be collectively or individually shifted in the axial direction. These members may be connected by swivel joints to the valve plate.

7 Claims, 9 Drawing Figures

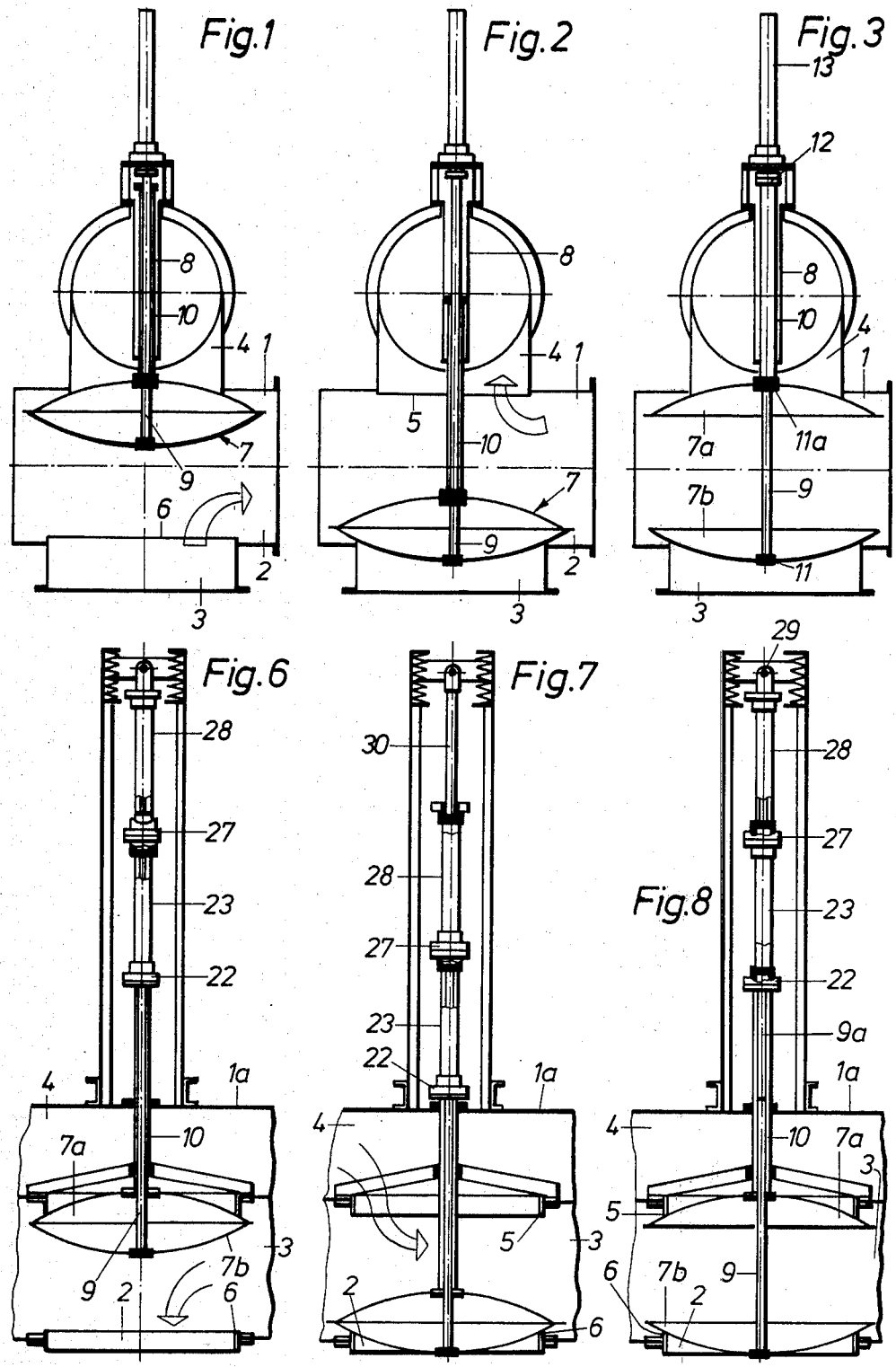

MULTIPORT DISK VALVE, ESPECIALLY FOR DUST-REMOVER DUCT SYSTEMS

FIELD OF THE INVENTION

Our present invention relates to multiport valves and, more particularly, to three-port valves having a disk-shaped valve member and adapted to handle large volumes of gas in, for example, dust-removal or dust-separation installations, e.g. of the filter type. More particularly, our invention relates to a valve adapted to seal two ports selectively or both of them simultaneously against relatively high pressures or vacuums and in duct systems of large diameter.

BACKGROUND OF THE INVENTION

The problem of controlling the flow of large volumes of gases which may carry considerable amounts of particulates, is especially pronounced in the dust-removal or dust-separation field in which valves may be used to selectively control the flow of the contaminated gas to a plurality of filter units and/or the flow of sparging or filter-cleaning gases and/or the flow of the cleaned gas.

The duct systems in which such valves are used are generally of large diameter so as to be capable of handling correspondingly large gas volumes and frequently the valves must be capable of sealing one or more ports or branches of the duct system against high pressure differentials produced by suction or pressurized gases.

Installations in which such valves may be used for a variety of industrial purposes, include metallurgical or chemical plants, power-generating plants, factories or other installations for ventilation purposes, and whenever exhaust gases carrying particulates are produced and in which the exhaust gases must ultimately, after cleaning, be discharged into the atmosphere.

It is known in such systems to provide disk valves for control of the gases, i.e. valves in which a port of the valve housing built into the duct system is formed with an annular seat which is engageable by a valve member of generally disk shape and movable toward and away from the seat, generally along the axis thereof and perpendicular to the plane of the disk, by a valve actuator, stem or spindle.

In German patent DE-PS No. 505,133, for example, there is described a disk valve having two valve plates mounted upon a common spindle and provided with right-hand and left-hand threads, respectively, so that rotation of the spindle in one sense will cause the two plates to bear against opposing seats of respective ports while rotation of the spindle in the opposite sense draws the plates against a partition which is horizontally disposed between them.

This system has the significant disadvantage that selective opening and closing of the two ports whose seats are juxtaposed with the respective valve plates, cannot be carried out. Such valves, therefore, are not capable of being used in multiport applications in which it may be desirable to connect one of the aforementioned ports to yet a further port or branched as is the case with many dust-removal duct systems.

For this purpose, especially with duct systems having a large throughput and hence large flow cross sections, for example, the valves of filter housings operable under pressure or under suction, disk valves can also be provided.

Such valves can be used to cut off one group of filter tubes or bags while the filter surfaces are cleaned and to bypass the contaminated dust to another set of filter surfaces, to connect the filters at their outlet sides selectively to a clean-gas duct, to control the flow of a sparging or cleaning gas to the filters, etc.

Valves of this type have valve plates which can engage one or the other of a pair of ports selectively and generally the valves plates are provided as membrane or domed members of a relatively thin material such as steel sheet so that elastic deformation of the valve plate members can ensure effective seating thereof.

However, such valves have problems when they are used in the aforedescribed way for selective blocking of ducts for the cleaning gas or for controlling the flow of the contaminated gas or the cleaned gas to and from a group of filter elements, because it is frequently necessary to completely cut off a filter chamber or zone to allow change or replacement of the filter surfaces.

The earlier valves were not suitable for this purpose.

OBJECT OF THE INVENTION

It is thus the principal object of the present invention to provide a disk valve for the purposes described which can permit, with a single actuator, the valve plate to selectively block one or another of two ports disposed opposite one another in the direction of valve movements, and simultaneously open or close completely these ports in respective positions of the valve member.

SUMMARY OF THE INVENTION

This object and others which will become apparent hereinafter are attained, in accordance with the present invention, in a valve which can be built into a duct system for the purposes described and has a housing provided with a pair of opposite, spaced apart annular seats each surrounding a respective valve port, and a valve member shiftable axially between these seats, the valve member comprising a pair of oppositely convex shells each adapted to engage one of the seats and further dimensioned to bear against one another along their edges.

The valve actuator comprises a pair of telescopingly connected rods, each connected to one of the shell and constructed and arranged to draw both shells against one of the seats, to urge both shells against the other seat, to displace each shell against the respective seat, or to enable the two shells in mutually engaged position to assume an intermediate position between the seats.

The actuator is provided with control or drive means for the two rods which are telescopingly connected, i.e. fitted into the other with freedom of relative axial movement.

The telescoping actuator comprises an inner member, which may be a solid rod, and a tubular rod in the form of a sleeve which surrounds the inner rod. The sleeve can be coupled to the upper shell while the inner rod is connected to the lower shell.

The telescopable rod enable the two shells to be pressed tightly against one another and in this mutually abutting relationship to be moved together when only one of the openings of the three-way housing is to be closed by the valve plate. When of course the telescoping assembly is extended, each of the shells can be brought into seating relationship with the respective port to exclude any flow through the valve housing.

The new disk-type valve of the present invention thus can be used effectively as a blocking or control device for the selective feed of the cleaning gas to a group of filter elements in a closed chamber and also to block flow to there from this chamber when it is necessary to cut out completely a group of filter elements. The cutting out of the group of filter elements thus can take place without affecting any other filter element to allow replacement of the defective group.

Naturally, the aforedescribed use of the three-way valve of the invention is only the preferred or best mode utility. The valve clearly has more general application.

To ensure the effective sealing of the shells against one another in their mutually abutting state or to ensure effective sealing of each of the shells against their respective seats, we have found it to be advantageous to permit a pendulous movement of the shells and their respective rods relative to the housing.

According to this aspect of the invention, therefore, means is provided to permit each plate to swing relative at least to a limited extent. Such means can include resilient elements (elastically deformable members) acting upon the respective rods and held against axial movement. The result is a cardanic or universal swivel movement to a limited extent.

According to another feature of the invention, the end of the outer telescoping member is provided with a coupling element which can abut and be connected with a stationary counter coupling member when the associated shell rests against the respective seat. This permits the valve lifting device or manual operation to raise the inner rod and the outer shell without affecting the movement of the outer rod or its shell.

A quick-release coupling can be used to lock the outer rod and its shell in its port-closing position.

Upon release of the coupling both of the rods and the respective shells can be displaced by the lifting device into the positions in which the shells abut and one or the other of the ports can be closed.

When the valve actuator is disposed vertically, the upper shell can bear against the lower shell in the mutually abutting position solely by gravity, i.e. its weight. It is also advantageous in some cases to provide locking means for connecting the two telescoping rods together when the shells are in mutual abutting relationship. The releasable locking element can be a spring-loaded pin. In this case, the valve can also be positioned so that the actuator is horizontal.

In addition to or to the exclusion of the above-mentioned coupling device for securing the outer rod to the housing, a system of two interconnected piston-and-cylinder arrangements (hereinafter simply "cylinders") can be provided so that the piston rods are connected to the actuator rods. The tandem arrangement of two such cylinders permits one to be used to displace both shells together while the other is used to displace the shells relative to one another.

BRIEF DESCRIPTION OF THE DRAWING

The above and other objects, features and advantages of the present invention will become more readily apparent from the following description, reference being made to the accompanying drawing in which:

FIG. 1 is a diagrammatic vertical section illustrating a first embodiment of a valve in accordance with the present invention in which the shells are pressed together and in their mutually abutting relationship are drawn against the upper valve seat;

FIG. 2 is a view similar to FIG. 1 but wherein the valve plate or disk formed by the mutually abutting shells is pressed against the lower valve seat;

FIG. 3 is a similar view of the same valve but wherein the two shells are spread apart to bear against the respective seats;

FIG. 6 is a vertical section through a valve according to another embodiment of the invention, shown in diagrammatic form, in which the mutually abutting shells are in their upper position;

FIG. 7 is a cross section through the valve of FIG. 6 showing the mutually abutting shells in their lower position;

FIG. 8 is a similar view of the same valve with the shells spread apart; and

SPECIFIC DESCRIPTION

Figure 4:
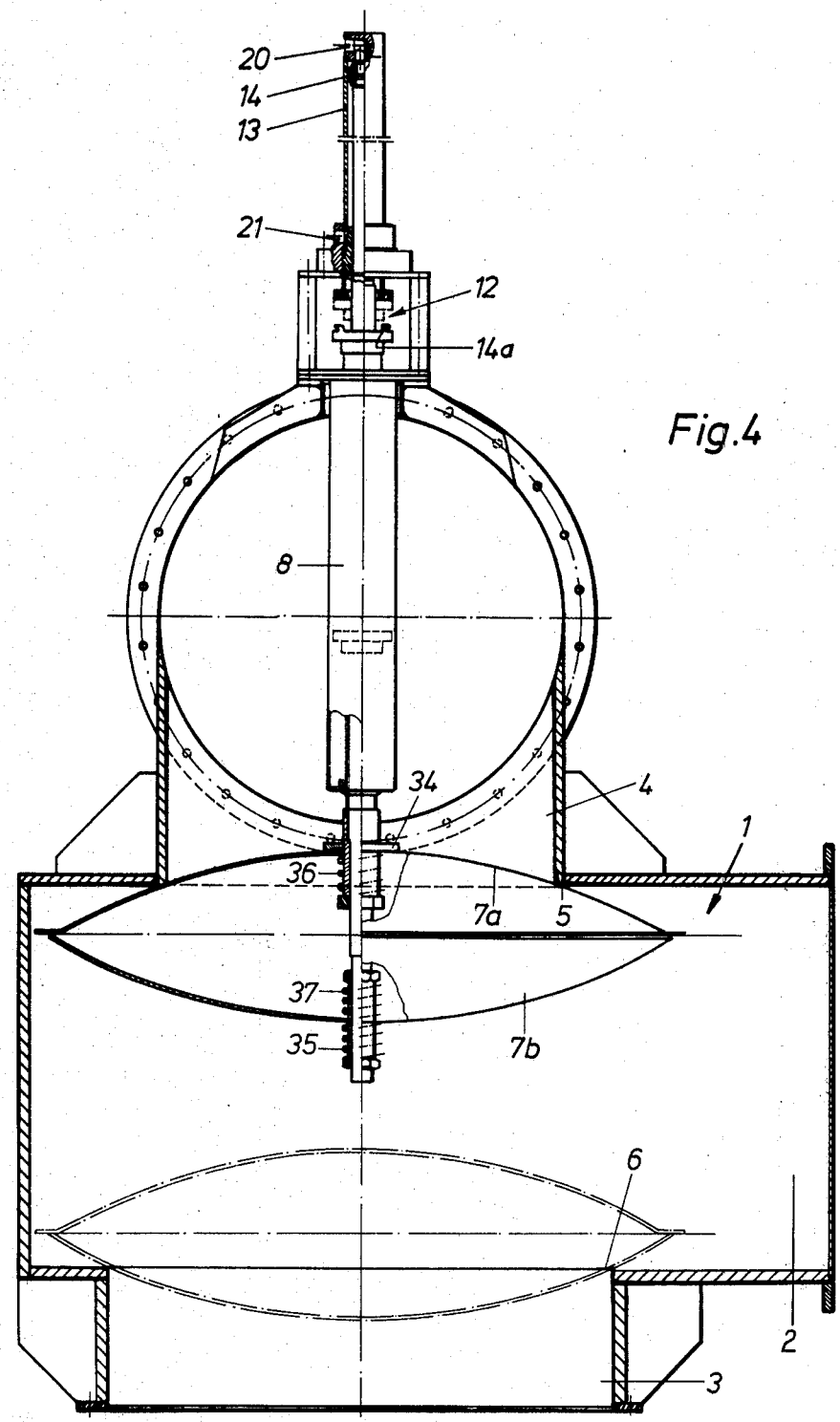
FIG. 4 is an axial cross-sectional view through a valve operating as shown in FIGS. 1 through 3 but illustrating the structure thereof in greater detail.

The three-way valve housing shown in FIGS. 1 through 3 is represented at 1 and comprises three ducts 2, 3 and 4 defining respective ports. The ports of ducts 3 and 4 are provided with seats 5 and 6 which are disposed opposite one another and are axially aligned in the vertical direction so that these seats can be engaged by a valve plate or disk represented at 7 and formed by the two oppositely convex domed shells 7a and 7b which are shown to be pressed together, i.e. in mutually abutting position in FIGS. 1 through 3.

The two shells 7a and 7b can be composed of thin sheet steel and are elastically deformable. The shells 7a and 7b are connected to two telescopingly connected rods 9 and 10 for joint movement or individual movement, the rods forming an actuator which extends vertically along the aforementioned axis. The inner rod 9 is connected centrally to the lower shell 7b while the outer rod 10 is tubular and slidably receives the inner rod while being connected itself centrally to the upper shell 7a. Thus the rod 10 forms a sleeve around the rod 9.

The telescoping rods 9, 10 are axially displaceable in a guide sleeve of the valve housing and are coaxial therewith.

The shells 7a and 7b are connected to the rods 9 and 10 by respective elastic hubs 11 and 11a which are prevented from moving axially relative to the respective rods but which permit a slight swivel movement of the respective shells when they engage one another or the respective seats.

The inner rod 9 is shown to extend through the sleeve 10 and a coupling member 12 at the upper end of this sleeve to a cylinder 13 of a lifting unit whose piston is connected to this inner rod and is represented at 14. (See FIG. 4).

As can be seen from FIGS. 1 through 4, the mutually abutting shells 7a and 7b can either engage the seat 5 (FIG. 1) or the seat 6 (FIG. 2) to cut off port 4 or port 3 from port 2 while allowing communication between the other port (3 or 4) in each case with port 2. In addition, the shells 7a and 7b can be spread apart to engage seats 5 and 6 (FIG. 3) and thereby completely cut off the space connected to port 2.

The coupling member 12 is provided with a flange 14c (FIG. 5) having axially extending hooks or claws 14a which are engageable, in the manner of a bayonet coupling, with a further coupling member 15 fixed to a housing portion 16 of the valve.

The flange 14c is limitedly axially shiftable on the sleeve 10 and can be locked to member 15 by engagement of the hooks 14a in recesses 15a of member 15, thereby bringing an abutment 17 of the sleeve 10 into rigid engagement with the spacer sleeve 14b connected to the flange 14c.

The connection of the coupling 12 to member 15 thus holds the sleeve 10 in its uppermost position in which the shell 7a seals the seat 5.

Figure 5:
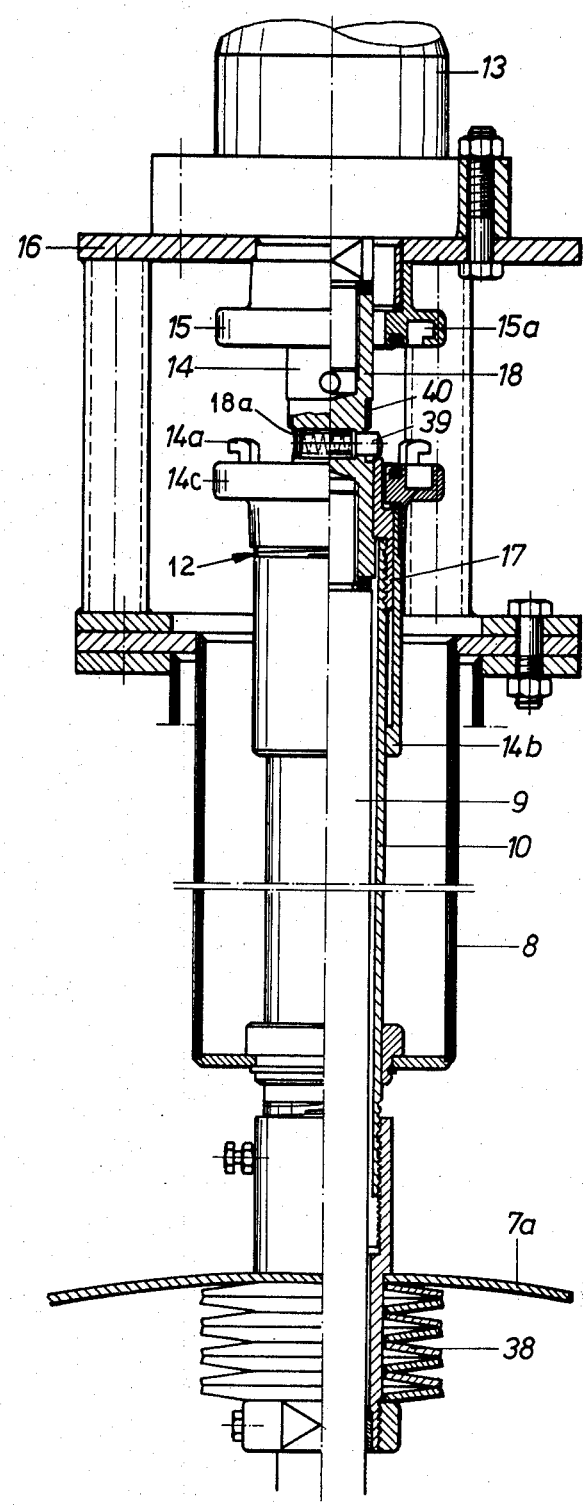
FIG. 5 is a detail view of the actuator assembly of the valve of FIG. 4 seen partly in elevation and partly in axial section.
Figure 9:
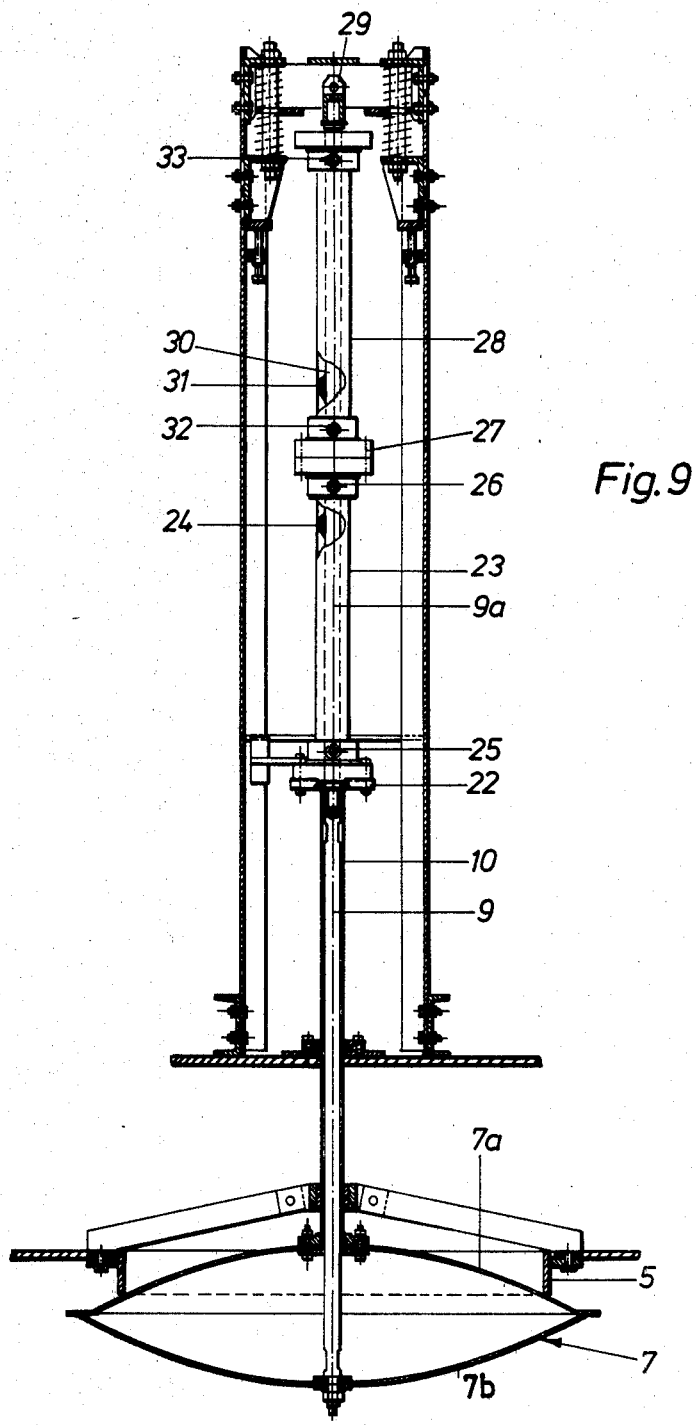
FIG. 9 is a cross-sectional view corresponding to the valve of FIGS. 6 through 8 showing the actuator in greater detail.

To permit the two shells 7a and 7b to be held together when the coupling 12 is released, a disengageable locking device is provided in the form of a spring-loaded locking pin 39 which is mounted in a bore 18a of a connecting piece 18 and which, as can be seen in FIG. 5, carries the sleeve 10 downwardly upon downward movement of the piston rod 14 as the inner rod 9 is lowered by cylinder 13. The pin 39 thus engages the abutment 17.

With the rod 9 lowered, the pin 39 can be depressed to clear the abutment 17 and permit the sleeve 10 to be raised.

The inner position of the pin 39 can be retained by sliding a locking ring 40 downwardly thereover to decouple the inner rod 9 from the sleeve 10.

FIGS. 4 and 5 also show that the rod 9, upon which the lower shell 9b is mounted, is rigid with the piston rod 14 via the connecting piece 18 so that fluid introduced at 20 into the space above the piston 14 can drive the shell 7b downwardly when the shell 7a is held in its upper position (FIG. 3) or when the shell 7a is linked to the shell 7b (FIG. 2).

To raise the shell 7b, fluid is fed into inlet 21 of the cylinder 13 thereby drawing the lower shell upwardly (FIG. 1).

In place of the elastomeric bodies 11, 11a which permit slight swivel motions of the shells, the shells 7a and 7b can be connected to the respective rods by coil springs 35 and 37 resting against axially spaced spring seats generally represented at 34 in FIG. 4, or dished disk springs such as has been represented by the stack of belleville washers 38 shown in FIG. 5.

FIGS. 6 through 9 illustrate another embodiment of the invention in which the valve housing 1a has a somewhat different configuration than the housing 1 through the shells 7a and 7b form a valve plate 7 with an inner rod 9 and a sleeve 10 in the manner previously described.

The positions of the shells as shown in FIGS. 6 through 9 correspond to that of FIGS. 1 through 3.

Here, however, the sleeve 10 is connected via a screw coupling 22 to a cylinder 23 (FIG. 9) into which an extension 9a of the rod 9 projects and forms a piston 24. The piston-and-cylinder arrangement 23, 24 when presurized, forms a double-acting cylinder drawing the shells 7a and 7b together or urging them apart. The double-acting cylinder 23, 24 is provided with fluid inlets 25 and 26 for this purpose.

The cylinder 23 is connected by another screw coupling 27 with a further cylinder 28 whose piston rod 30 projects from its upper end and can be connected to the housing. Fluid inlets 32 and 33 are provided for cylinder 28 on opposite sides of the piston 31 thereof connected to the rod 30.

Thus the double-acting cylinder 28, 31 can be presurized to displace both members 9 and 10 simultaneously upwardly and downwardly, i.e. between the positions shown in FIGS. 6 and 7. In an upper position, the double-acting cylinder 23, 24 is effective to urge the shells 7a and 7b into engagement with the respective ports.

We claim:
1. A valve comprising:
 a valve housing formed with a pair of spaced-apart opposite ports along a common axis and at least one further port, each of said opposite ports being provided with a respective valve seat;
 a valve plate in said housing between said opposite ports having a pair of oppositely convex shells each engageable with a respective one of said seats and concave toward one another; and
 a pair of telescopingly engaged relatively shiftable rods extending along the axis of said opposite ports and each connected to a respective one of said shells for allowing said shells to be drawn together into mutually abutting relationship at their edges to form a closed double convex body engageable with either of said ports and allowing said shells to be urged by common movement of said rod to engage said seats selectively and, upon relative movement of said rods, to be urged individually into engagement with the respective seats.

2. The valve defined in claim 1, further comprising means mounting each of said shells upon the respective rod with limited swivelability.

3. The valve defined in claim 2 wherein the last-mentioned means is an elastic body.

4. The valve defined in claim 1 wherein said rods include an inner rod and a sleeve receiving said inner rod, said sleeve being formed at its end remote from the respective shell with a coupling for releasably locking said sleeve to said housing with the shell attached to said sleeve in sealing engagement with the respective seat.

5. The valve defined in claim 1, further comprising releasable locking means for interconnecting said rods for joint movement.

6. The valve defined in claim 5 wherein said releasable locking means includes a spring-loaded locking pin on one of said rods.

7. The valve defined in claim 1, 2, 3 or 5, further comprising a pair of tandem cylinders including a first cylinder interconnecting said rods and fluid pressurizable to urge said shells together and apart, and a second cylinder connected between said first cylinder and housing for joint movement of said rods.

* * * * *